United States Patent
Zhang et al.

(10) Patent No.: US 9,634,809 B2
(45) Date of Patent: Apr. 25, 2017

(54) MOBILE COMMUNICATIONS TERMINAL, AND METHOD FOR CONTROLLING RADIO FREQUENCY POWER AMPLIFIER THEREOF

(71) Applicant: Huawei Device Co., Ltd., Shenzhen (CN)

(72) Inventors: Zhangong Zhang, Shenzhen (CN); Meifang Zhong, Wuhan (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 189 days.

(21) Appl. No.: 14/581,727

(22) Filed: Dec. 23, 2014

(65) Prior Publication Data

US 2015/0110057 A1    Apr. 23, 2015

Related U.S. Application Data

(63) Continuation of application No. PCT/CN2013/086138, filed on Oct. 29, 2013.

(30) Foreign Application Priority Data

Nov. 5, 2012 (CN) .......................... 2012 1 0436138

(51) Int. Cl.
*H04L 5/00* (2006.01)
*H04W 52/52* (2009.01)
*H04W 52/02* (2009.01)

(52) U.S. Cl.
CPC .......... *H04L 5/0044* (2013.01); *H04W 52/028* (2013.01); *H04W 52/0261* (2013.01); *H04W 52/52* (2013.01); *Y02B 60/50* (2013.01)

(58) Field of Classification Search
CPC ...... Y02B 60/50; H04B 1/005; H04B 1/0475; H04B 1/44; H04B 1/71637; H04B 1/16;
(Continued)

(56) References Cited

U.S. PATENT DOCUMENTS 5,515,000 A * 5/1996 Maruyama ............ H03F 1/3235
330/151
5,565,814 A * 10/1996 Fukuchi ................. H03F 1/3235
330/151

(Continued)

FOREIGN PATENT DOCUMENTS

CN    101331742 A    12/2008
CN    101605388 A    12/2009
(Continued)

OTHER PUBLICATIONS

"3rd Generation Partnership Project; Technical Specification Group Radio Access Network; User Equipment (UE) Procedures in Idle Mode and Procedures for Cell Reselection in Connected Mode (Release 10)," 3GPP TS 25.304 V10.1.0, Jun. 2011, 52 pages.

*Primary Examiner* — Michael Thier
*Assistant Examiner* — Eric Nowlin
(74) *Attorney, Agent, or Firm* — Oblon, McClelland, Maier & Neustadt, L.L.P.

(57) ABSTRACT

The present invention discloses a mobile communications terminal. The mobile communications terminal includes a signal processing module and a radio frequency power amplifier, where the signal processing module outputs, to a radio frequency signal input end of the radio frequency power amplifier, a radio frequency signal corresponding to one group of data packets, and synchronously outputs an enable signal to an enable signal input end of the radio frequency power amplifier; and the signal processing module periodically stops outputting the enable signal to the enable signal input end within first predetermined duration, and outputs, to the radio frequency signal input end, a radio frequency signal corresponding to at least one piece of pilot data and synchronously outputs the enable signal to the
(Continued)

enable signal input end within second predetermined duration.

10 Claims, 3 Drawing Sheets

(58) Field of Classification Search
CPC .... H04B 2001/0416; H04B 2001/0425; H04B 2001/0433; H04B 2001/045; H04B 7/15535; H04B 2201/70701; H04B 2201/70706; H04L 27/2614; H04L 5/0044; H04W 52/0261; H04W 52/028; H04W 52/52

See application file for complete search history.

(56) References Cited

U.S. PATENT DOCUMENTS

| | | | | |
|---|---|---|---|---|
| 5,896,368 | A * | 4/1999 | Dahlman | H04B 1/707 370/335 |
| 6,320,913 | B1 * | 11/2001 | Nakayama | H03F 3/72 330/51 |
| 6,553,212 | B1 * | 4/2003 | Wey | H04W 52/52 376/318 |
| 6,795,428 | B1 * | 9/2004 | Diachina | H04W 72/1278 370/349 |
| 7,058,369 | B1 * | 6/2006 | Wright | H01Q 1/243 375/297 |
| 7,203,208 | B2 * | 4/2007 | Ushirokawa | H04W 24/10 370/320 |
| 2001/0054931 | A1 * | 12/2001 | Bar-David | H03F 1/0222 330/10 |
| 2002/0080891 | A1 * | 6/2002 | Ahn | H03F 1/3247 375/297 |
| 2003/0112066 | A1 * | 6/2003 | Posner | H03F 1/3235 330/52 |
| 2004/0203542 | A1 * | 10/2004 | Seo | H03F 1/3247 455/126 |
| 2004/0263245 | A1 * | 12/2004 | Winter | H03F 1/0222 330/10 |
| 2005/0197066 | A1 * | 9/2005 | Maruyama | H03F 1/0277 455/63.1 |
| 2007/0142081 | A1 * | 6/2007 | Lindqvist | G03B 15/0447 455/556.1 |
| 2007/0291668 | A1 * | 12/2007 | Duan | H04B 7/15535 370/280 |
| 2010/0027596 | A1 * | 2/2010 | Bellaouar | H03G 3/3047 375/219 |
| 2010/0317301 | A1 * | 12/2010 | Wang | H04W 52/0216 455/127.1 |
| 2012/0044845 | A1 * | 2/2012 | Lee | H04W 52/0206 370/311 |
| 2012/0100897 | A1 * | 4/2012 | Chen | H03F 1/0244 455/574 |

FOREIGN PATENT DOCUMENTS

JP        2008245130 A     10/2008
WO        2012023697 A1    2/2012

\* cited by examiner

MOBILE COMMUNICATIONS TERMINAL, AND METHOD FOR CONTROLLING RADIO FREQUENCY POWER AMPLIFIER THEREOF

This application is a continuation of International Application No. PCT/CN2013/086138, filed on Oct. 29, 2013, which claims priority to Chinese Patent Application No. 201210436138.7, filed on Nov. 5, 2012, both of which are hereby incorporated by reference in their entireties.

TECHNICAL FIELD

The present invention relates to the field of communications technologies, and in particular, to a mobile communications terminal, and a method for controlling a radio frequency power amplifier based on a mobile communications terminal.

BACKGROUND

In mobile communications terminals such as mobile phones and personal handyphone systems, power amplification processing needs to be performed on a radio frequency signal by using a radio frequency power amplifier (RFPA, Radio Frequency Power Amplifier) and then the radio frequency signal is sent to a base station by using an antenna. Therefore, a radio frequency power amplifier is usually a module that consumes the largest amount of power in a mobile communications terminal, and if a working mode of the radio frequency power amplifier can be properly controlled, an amount of electricity can be saved to reduce power consumption and prolong a standby time.

Figure 1:
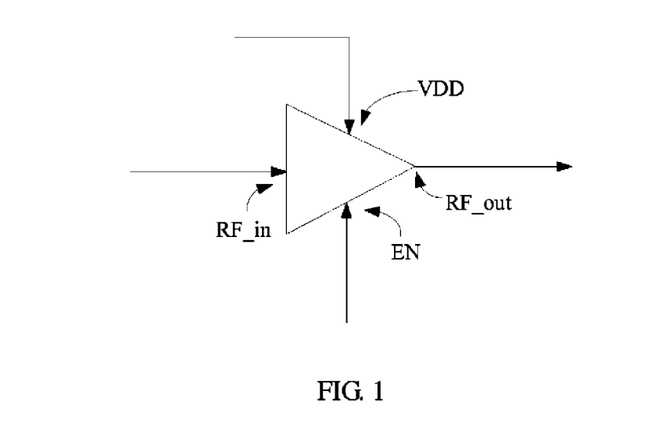
FIG. 1 is a schematic diagram of a pin of a radio frequency power amplifier in the prior art.

Referring to FIG. 1, FIG. 1 is a schematic diagram of a pin of a radio frequency power amplifier in the prior art. As shown in FIG. 1, the radio frequency power amplifier is provided with an enable signal input end EN, a radio frequency signal input end RF_in, a radio frequency signal output end RF_out, and a power supply input end VDD. The power supply input end VDD obtains a power supply to supply power, and the radio frequency signal input end RF_in obtains a radio frequency signal. When an enable signal input obtains an enable signal, the radio frequency power amplifier enters a working state and performs power amplification processing on the obtained radio frequency signal and outputs, from the radio frequency signal output end RF_out, and when the enable signal input end EN does not obtain an enable signal, the radio frequency power amplifier enters a dormant state and does not perform the power amplification processing on the obtained radio frequency signal. Power consumption of the radio frequency power amplifier in the dormant state is much less than that of the radio frequency power amplifier in the working state.

Figure 2:
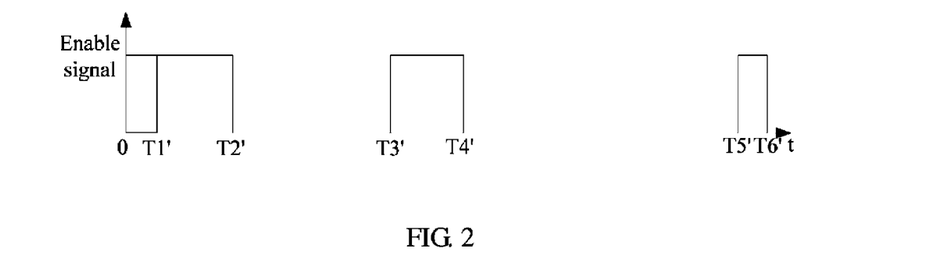
FIG. 2 is a sequence diagram of input of an enable signal at an enable signal input end of a radio frequency power amplifier in the prior art.

Referring to FIG. 2, FIG. 2 is a sequence diagram of input of an enable signal at an enable signal input end EN of a radio frequency power amplifier in the prior art. In the prior art, a mobile communications terminal establishes an uplink traffic channel with a base station, and the mobile communications terminal sends an uplink data signal to the base station over the uplink traffic channel. As shown in FIG. 2, within duration 0-T1', an enable signal is input to the enable signal input end EN, and the radio frequency power amplifier enters a working state; and in the meantime, the uplink traffic channel is established, and the mobile communications terminal needs to send, to the base station, a radio frequency signal corresponding to signaling that is used to establish the uplink traffic channel. Therefore, the radio frequency power amplifier needs to perform power amplification processing on the radio frequency signal to ensure establishment of the uplink traffic channel.

Within duration T1'-T2', an enable signal is input to the enable signal input end EN, and the radio frequency power amplifier works normally; and in the meantime, the mobile communications terminal needs to send a group of data packets to the base station, where the group of data packets need to be modulated into a radio frequency signal before being sent, and the power amplification processing is performed on the radio frequency signal. Therefore, in the meantime, the radio frequency power amplifier needs to be enabled to perform the power amplification processing on the radio frequency signal corresponding to the group of data packets.

After the uplink traffic channel is established, generally, data packets are not sent continuously but intermittently, that is, after sending of a group of data packets is completed, it needs to wait for a period of time before another group of data packets are generated, and sent to the base station over the uplink traffic channel.

Therefore, in the prior art, within duration T2'-T3' between a time when sending of a group of data packets is completed and a time when another group of data packets are generated, outputting of an enable signal to the enable signal input end EN is stopped, so that the radio frequency power amplifier enters a dormant state. However, when the another group of data packets are generated, the enable signal is output to the enable signal input end EN, so that the radio frequency power amplifier enters a working state, and the radio frequency power amplifier performs the power amplification processing on a radio frequency signal corresponding to the another group of data packets, thereby implementing energy saving.

After processing on the radio frequency signal corresponding to the another group of data packets is completed, outputting of the enable signal to the enable signal input end EN is stopped within duration T4'-T5', so that the radio frequency power amplifier enters the dormant state, and at the time T5' at which the uplink traffic channel needs to be removed, the enable signal is output to enable the radio frequency power amplifier, thereby ensuring that the power amplification processing can be performed, in the radio frequency power amplifier, on a radio frequency signal corresponding to a signaling signal that is used to remove the uplink traffic channel. After the uplink traffic channel is removed, that is, at a time T6', outputting of the enable signal is stopped, the radio frequency power amplifier stops working.

To achieve an objective of reducing power consumption, in the prior art, a radio frequency power amplifier is controlled to be in a dormant state within duration T2'-T3' within which an uplink traffic channel is in an idle state and within duration T4'-T5'; however, power amplification processing of the radio frequency power amplifier cannot be performed on a radio frequency signal that corresponds to pilot data and is generated in the meantime by a mobile communications terminal, so that a base station cannot normally receive the radio frequency signal that corresponds to the pilot data and is sent by the mobile communications terminal, and therefore cannot evaluate channel quality according to the radio frequency signal. In this case, if the base station detects no radio frequency signal corresponding to the pilot data within a time interval that exceeds a pilot detection timeout duration, the base station may determine that the mobile communications terminal is offline and that the uplink traffic channel abnormally ends, and actively close a downlink traffic data channel, so that a call drop of a data service occurs, thereby deteriorating communications quality.

SUMMARY

A technical problem mainly solved by this application is to provide embodiments of a mobile communications terminal, and a method for controlling a radio frequency power amplifier thereof, which can ensure normal working of an uplink traffic channel while effectively reducing power consumption.

According to a first aspect, a mobile communications terminal is provided, where the mobile communications terminal establishes an uplink traffic channel with a base station, and the mobile communications terminal includes a signal processing module and a radio frequency power amplifier, where the signal processing module outputs, to a radio frequency signal input end of the radio frequency power amplifier, a radio frequency signal corresponding to one group of data packets, and synchronously outputs an enable signal to an enable signal input end of the radio frequency power amplifier; and within duration between a time after the radio frequency signal corresponding to the group of data packets is output to the radio frequency signal input end and a time when a radio frequency signal corresponding to another group of data packets is output to the radio frequency signal input end, the signal processing module periodically stops outputting the enable signal to the enable signal input end within first predetermined duration, and outputs, to the radio frequency signal input end, a radio frequency signal corresponding to at least one piece of pilot data and synchronously outputs the enable signal to the enable signal input end within second predetermined duration, where the first predetermined duration is less than pilot detection timeout duration of the base station, and the group of data packets and the another group of data packets are data packets that need to be transmitted over the uplink traffic channel.

With reference to the implementation manner of the first aspect, in a first possible implementation manner, after outputting, to the radio frequency signal input end, the radio frequency signal corresponding to the group of data packets, the signal processing module further keeps outputting the enable signal to the enable signal input end within preset extended duration.

With reference to the implementation manner of the first aspect, in a second possible implementation manner, the group of data packets, the another group of data packets, and the pilot data are recorded in one or more radio frames.

With reference to the implementation manner of the first aspect, in a third possible implementation manner, the radio frequency power amplifier performs power amplification processing on the radio frequency signal corresponding to the group of data packets, the radio frequency signal corresponding to the another group of data packets, and the radio frequency signal corresponding to the at least one piece of pilot data that are input to the radio frequency signal input end.

With reference to the third possible implementation manner of the first aspect, in a fourth possible implementation manner, the mobile communications terminal further includes an antenna, the radio frequency power amplifier is further provided with a radio frequency signal output end, the radio frequency power amplifier sends, to the antenna by using the radio frequency signal output end, the radio frequency signal corresponding to the group of data packets, the radio frequency signal corresponding to the another group of data packets, and the radio frequency signal corresponding to the at least one piece of pilot data that are after the power amplification processing, and the antenna sends, to the base station, the radio frequency signal corresponding to the group of data packets, the radio frequency signal corresponding to the another group of data packets, and the radio frequency signal corresponding to the at least one piece of pilot data that are after the power amplification processing.

According to a second aspect, a method for controlling a radio frequency power amplifier of a mobile communications terminal is provided, where the mobile communications terminal establishes an uplink traffic channel with a base station, the mobile communications terminal includes a signal processing module and a radio frequency power amplifier, and the method includes the following steps: outputting, to a radio frequency signal input end of the radio frequency power amplifier, a radio frequency signal corresponding to one group of data packets, and synchronously outputting an enable signal to an enable signal input end of the radio frequency power amplifier; and within duration between a time after the radio frequency signal corresponding to the group of data packets is output to the radio frequency signal input end and a time when a radio frequency signal corresponding to another group of data packets is output to the radio frequency signal input end, periodically stopping outputting the enable signal to the enable signal input end within first predetermined duration, and outputting, to the radio frequency signal input end, a radio frequency signal corresponding to at least one piece of pilot data and synchronously outputting the enable signal to the enable signal input end within second predetermined duration, where the first predetermined duration is less than pilot detection timeout duration of the base station, and the group of data packets and the another group of data packets are data packets that need to be transmitted over the uplink traffic channel.

With reference to the implementation manner of the second aspect, in a first possible implementation manner, after the radio frequency signal corresponding to the group of data packets is output to the radio frequency signal input end, the enable signal is further kept being output to the enable signal input end within preset extended duration.

With reference to the implementation manner of the second aspect, in a second possible implementation manner, the group of data packets, the another group of data packets, and the pilot data are recorded in one or more radio frames.

With reference to the implementation manner of the second aspect, in a third possible implementation manner, the radio frequency power amplifier performs power amplification processing on the radio frequency signal corresponding to the group of data packets, the radio frequency signal corresponding to the another group of data packets, and the radio frequency signal corresponding to the at least one piece of pilot data that are input to the radio frequency signal input end.

With reference to the third implementation manner of the second aspect, in a fourth possible implementation manner, the mobile communications terminal further includes an antenna, the radio frequency power amplifier is further provided with a radio frequency signal output end, the radio frequency power amplifier sends, to the antenna by using the radio frequency signal output end, the radio frequency signal corresponding to the group of data packets, the radio frequency signal corresponding to the another group of data packets, and the radio frequency signal corresponding to the at least one piece of pilot data that are after the power amplification processing, and the antenna sends, to the base station, the radio frequency signal corresponding to the group of data packets, the radio frequency signal corresponding to the another group of data packets, and the radio frequency signal corresponding to the at least one piece of pilot data that are after the power amplification processing.

Different from the situations in the prior art, according to the mobile communications terminal and the method for controlling a radio frequency power amplifier thereof in the embodiments of this application, when an uplink traffic channel is in an idle state, outputting of an enable signal to an enable signal input end of a radio frequency power amplifier is periodically stopped within first predetermined duration, so as to make the radio frequency power amplifier be dormant; and a radio frequency signal corresponding to at least one piece of pilot data is output to a radio frequency signal input end of the radio frequency power amplifier and the enable signal is synchronously output to the enable signal input end within second predetermined duration, so as to make the radio frequency power amplifier work. Because the radio frequency power amplifier is dormant within the first predetermined duration, power consumption can be reduced. Within the second predetermined duration, the radio frequency power amplifier is enabled, and the radio frequency signal corresponding to the at least one piece of pilot data is output to the radio frequency signal input end, so that it can be ensured that the radio frequency signal corresponding to the at least one piece of pilot data can be input to the enabled radio frequency power amplifier for subsequent processing; and in an adjacent period, because a time interval between adjacent radio frequency signals corresponding to the pilot data is the first predetermined duration, which is less than pilot detection timeout duration, for the pilot data, of a base station, the base station does not determine, because the radio frequency signal corresponding to the pilot data is not detected within the first predetermined duration, that the mobile communications terminal is offline, thereby ensuring normal working of the uplink traffic channel

DETAILED DESCRIPTION OF ILLUSTRATIVE EMBODIMENTS

An embodiment of the present invention provides a mobile communications terminal, where the mobile communications terminal establishes an uplink traffic channel with a base station, where the mobile communications terminal includes a signal processing module and a radio frequency power amplifier, where the signal processing module outputs, to a radio frequency signal input end of the radio frequency power amplifier, a radio frequency signal corresponding to one group of data packets, and synchronously outputs an enable signal to an enable signal input end of the radio frequency power amplifier; and within duration between a time after the radio frequency signal corresponding to the group of data packets is output to the radio frequency signal input end and a time when a radio frequency signal corresponding to another group of data packets is output to the radio frequency signal input end, the signal processing module periodically stops outputting the enable signal to the enable signal input end within first predetermined duration, and outputs, to the radio frequency signal input end, a radio frequency signal corresponding to at least one piece of pilot data and synchronously outputs the enable signal to the enable signal input end within second predetermined duration, where the first predetermined duration is less than pilot detection timeout duration of the base station, and the group of data packets and the another group of data packets are data packets that need to be transmitted over the uplink traffic channel.

An embodiment of the present invention further provides a method for controlling a radio frequency power amplifier of a mobile communications terminal, where the mobile communications terminal establishes an uplink traffic channel with a base station, the mobile communications terminal includes a signal processing module and a radio frequency power amplifier, and the method includes the following steps: outputting, to a radio frequency signal input end of the radio frequency power amplifier, a radio frequency signal corresponding to one group of data packets, and synchronously outputting an enable signal to an enable signal input end of the radio frequency power amplifier; and within duration between a time after the radio frequency signal corresponding to the group of data packets is output to the radio frequency signal input end and a time when a radio frequency signal corresponding to another group of data packets is output to the radio frequency signal input end, periodically stopping outputting the enable signal to the enable signal input end within first predetermined duration, and outputting, to the radio frequency signal input end, a radio frequency signal corresponding to at least one piece of pilot data and synchronously outputting the enable signal to the enable signal input end within second predetermined duration, where the first predetermined duration is less than pilot detection timeout duration of the base station, and the group of data packets and the another group of data packets are data packets that need to be transmitted over the uplink traffic channel.

By using the foregoing technical solutions, the mobile communications terminal, and the method for controlling a radio frequency power amplifier thereof in the embodiments of the present invention can ensure normal working of an uplink traffic channel while effectively reducing power consumption of the mobile communications terminal.

The mobile communications terminal and the method for controlling a radio frequency power amplifier thereof according to the embodiments of the present invention are described in the following with reference to specific embodiments.

Figure 3:
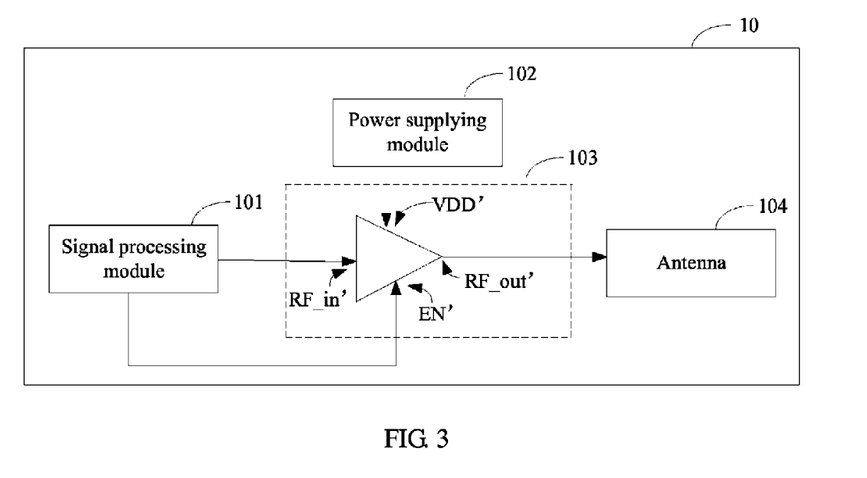
FIG. 3 is a schematic diagram of a circuit structure of a mobile communications terminal according to a first embodiment of the present invention.

Referring to FIG. 3, FIG. 3 is a schematic diagram of a circuit structure of a mobile communications terminal according to a first embodiment of the present invention. As shown in FIG. 3, in this embodiment, the mobile communications terminal 10 of the present invention includes a signal processing module 101, a power supplying module 102, a radio frequency power amplifier 103, and an antenna 104, where the mobile communications terminal 10 performs wireless communication with a base station (which is not shown) by using the antenna 104.

The radio frequency power amplifier 103 is consistent with that described in FIG. 1, and the radio frequency power amplifier 103 is provided with an enable signal input end EN', a radio frequency signal input end RF_in', a radio frequency signal output end RF_out', and a power supply input end VDD'. The power supply input end VDD' obtains a power supply from the power supplying module 102 to supply power; the radio frequency signal input end RF_in' obtains a radio frequency signal from the signal processing module 101; when the enable signal input end EN' obtains an enable signal from the signal processing module 101, the radio frequency power amplifier 103 enters a working state and performs power amplification processing on the obtained radio frequency signal and outputs, from the radio frequency signal output end RF_out'; and when the enable signal input end EN' does not obtain an enable signal from the signal processing module 101, the radio frequency power amplifier 103 enters a dormant state and does not perform the power amplification processing on the obtained radio frequency signal. Power consumption of the radio frequency power amplifier 103 in the dormant state is much less than that in the working state.

Figure 4:
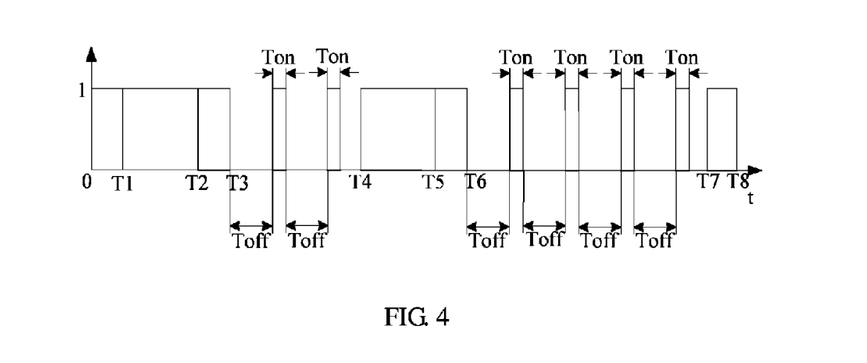
FIG. 4 is a sequence diagram of power supplying of a radio frequency power amplifier according to the first embodiment of the present invention.

Referring to FIG. 4, FIG. 4 is a sequence diagram of input of an enable signal at the enable signal input end EN' of the radio frequency power amplifier 103 according to the first embodiment of the present invention. As shown in FIG. 4, in FIG. 4, a horizontal axis represents time, and a vertical axis represents whether an enable signal is input to the enable signal input end EN'. When a value of the vertical axis is "0", it indicates that no enable signal is input to the enable signal input end EN'; and when a value of the vertical axis is "1", it indicates that an enable signal is input to the enable signal input end EN'.

As shown in FIG. 4, within duration 0-T1, the signal processing module 101 outputs, to the radio frequency signal input end RF_in' of the radio frequency power amplifier 103, a radio frequency signal corresponding to signaling that is used to establish an uplink channel, and synchronously outputs the enable signal to the enable signal input end EN', so as to make the radio frequency power amplifier 103 enter the working state. In the meantime, the radio frequency power amplifier 103 performs the power amplification processing on the radio frequency signal, and outputs, from the radio frequency signal output end RF_out' to the antenna 104, the radio frequency signal that is after the power amplification processing, the antenna 104 sends the radio frequency signal to the base station, and after obtaining the radio frequency signal, the base station obtains through demodulation processing the signaling that is used to establish the uplink channel, so as to make a response to establish an uplink traffic channel with the mobile communications terminal 10.

Within duration T1-T2, the signal processing module 101 outputs, to a signal input end of the radio frequency power amplifier 103, a radio frequency signal corresponding to one group of data packets and synchronously outputs the enable signal to the enable signal input end EN' of the radio frequency power amplifier 103, so as to make the radio frequency power amplifier 103 enter the working state. In the meantime, the radio frequency power amplifier 103 performs the power amplification processing on the radio frequency signal, and outputs, from the radio frequency signal output end RF_out' to the antenna 104, the radio frequency signal that is after the power amplification processing, the antenna 104 sends the radio frequency signal to the base station, and after obtaining the radio frequency signal, the base station may obtain through demodulation processing the group of data packets, thereby implementing transferring of data packets.

Within duration T2-T3, the signal processing module 101 keeps outputting the enable signal to the enable signal input end EN' after outputting, to the signal input end of the radio frequency power amplifier 103, the radio frequency signal corresponding to the group of data packets, so as to make the radio frequency power amplifier 103 enter the working state. The duration T2-T3 is preset extended duration, and aims to ensure that the radio frequency signal corresponding to the group of data packets can be completely sent to the radio frequency signal input end RF_in' for the power amplification processing, so as to avoid that before the sending is completed (for example, output of the signal processing module 101 is delayed due to various reasons), the enable signal is stopped from being output to the radio frequency power amplifier 103, which makes the radio frequency power amplifier 103 enter the dormant state, and results in a situation of data loss.

In an alternative embodiment of the present invention, the preset extended duration may not be set according to needs. The preset extended duration may not be set as required by a system that has a low requirement on data transmission accuracy.

Within duration T3-T4, the signal processing module 101 periodically stops outputting the enable signal to the enable signal input end EN' within first predetermined duration Toff, and outputs, to the signal input end, a radio frequency signal corresponding to at least one piece of pilot data and synchronously outputs the enable signal to the enable signal input end EN' within second predetermined duration Ton. Within the duration T3-T4, the uplink traffic channel is in an idle state to reduce power consumption; and in this embodiment, the enable signal is periodically stopped from being output to the enable signal input end EN' within the first predetermined duration Toff, so as to ensure that the radio frequency power amplifier 103 can periodically keep dormant when the uplink traffic channel is in the idle state.

After the mobile communications terminal 10 establishes the uplink traffic channel with the base station, the base station continually detects whether pilot data is obtained from the mobile communications terminal 10, and determines, when no pilot data is obtained within predetermined duration, that the mobile communications terminal 10 is offline, where the predetermined duration is pilot detection timeout duration.

To avoid that the base station determines, because no pilot data is detected within a time interval being the pilot detection timeout duration, that the mobile communications terminal 10 is offline, in this embodiment, the following settings are made: within the second predetermined duration Ton, the signal processing module 101 outputs, to the signal input end, the radio frequency signal corresponding to the at least one piece of pilot data and synchronously outputs the enable signal to the enable signal input end EN'; and the first predetermined duration Toff is set to be less than the pilot detection timeout duration of the base station.

Because within the second predetermined duration Ton, the radio frequency power amplifier 103 is enabled, and the radio frequency signal corresponding to the at least one piece of pilot data is output to the radio frequency signal input end RF_in', it can be ensured that the radio frequency signal corresponding to the at least one piece of pilot data can be input to the enabled radio frequency power amplifier 103 for subsequent processing, and in an adjacent period, because a time interval between adjacent radio frequency signals corresponding to the pilot data is the first predetermined duration Toff, which is less than pilot detection timeout duration, for the pilot data, of the base station, the base station does not determine, because the radio frequency signal corresponding to the pilot data is not detected within the first predetermined duration Toff, that the mobile communications terminal 10 is offline, thereby ensuring normal working of the uplink traffic channel.

Within duration T4-T5, the signal processing module 101 outputs, to the radio frequency signal input end RF_in', a radio frequency signal corresponding to another group of data packets and synchronously outputs the enable signal to the enable signal input end EN' of the radio frequency power amplifier 103, so as to make the radio frequency power amplifier 103 enter the working state. The another group of data packets and the foregoing group of data packets are data packets that need to be transmitted over a same uplink traffic channel; and in the meantime, the radio frequency power amplifier 103 performs the power amplification processing on the radio frequency signal, and outputs, from the radio frequency signal output end RF_out' to the antenna 104, the radio frequency signal that is after the power amplification processing, the antenna 104 sends the radio frequency signal to the base station, and after obtaining the radio frequency signal, the base station may obtain through demodulation processing the another group of data packets, thereby implementing transferring of data packets.

Within duration T5-T6, the signal processing module 101 keeps outputting the enable signal to the enable signal input end EN' after outputting, to the signal input end of the radio frequency power amplifier 103, the radio frequency signal corresponding to the another group of data packets, so as to make the radio frequency power amplifier 103 enter the working state. The duration T5-T6 is preset extended duration, and aims to ensure that the radio frequency signal corresponding to the group of data packets can be completely sent to the radio frequency signal input end RF_in' for the power amplification processing, so as to avoid that before the sending is completed (for example, output of the signal processing module 101 is delayed due to various reasons), the enable signal is stopped from being output to the radio frequency power amplifier 103, which makes the radio frequency power amplifier 103 enter the dormant state, and results in a situation of data loss. A function of the radio frequency power amplifier 103 is consistent with that within the foregoing duration T2-T3.

In an alternative embodiment of the present invention, the preset extended duration may not be set according to needs. The preset extended duration may not be set in a case in which a requirement on data transmission accuracy is not high according to a system requirement.

Within duration T6-T7, the signal processing module 101 periodically stops outputting the enable signal to the enable signal input end EN' within the first predetermined duration Toff when the uplink traffic channel is in an idle state, and outputs, to the signal input end, the radio frequency signal corresponding to the at least one piece of pilot data and synchronously outputs the enable signal to the enable signal input end EN' within the second predetermined duration Ton. Working modes of the signal processing module 101 and the radio frequency power amplifier 103 within the duration T5-T6 are consistent with those within the duration T3-T4, and no details are repeatedly described herein.

Duration T7-T8 is a time required for removing the uplink traffic channel; and within the duration, the signal processing module 101 outputs, to the radio frequency signal input end RF_in' of the radio frequency power amplifier 103, a radio frequency signal corresponding to signaling that is used to remove the uplink channel, and synchronously outputs the enable signal to the enable signal input end EN', so as to make radio frequency power amplifier 103 enter the working state. In the meantime, the radio frequency power amplifier 103 performs the power amplification processing on the radio frequency signal, and outputs, from the radio frequency signal output end RF_out' to the antenna 104, the radio frequency signal that is after the power amplification processing, the antenna 104 sends the radio frequency signal to the base station, and after obtaining the radio frequency signal, the base station obtains through demodulation processing the signaling that is used to remove the uplink channel, so as to make a response to remove the uplink traffic channel.

It should be noted that, in the present invention, for ease of description, only one group of data packets and another group of data packets are used to represent data packets transmitted over the uplink traffic channel within duration T1-T7 between a time after the uplink traffic channel is established and a time when removal of the uplink traffic channel starts. However, in an actual application, a plurality of discontinuous groups of data packets usually needs to be sent over the uplink traffic channel. The plurality of discontinuous groups of data packets may be spaced apart by specific duration, and within the specific duration, an uplink service communications channel is in an idle state. According to the idea of the present invention, within the specific duration, the signal processing module 101 periodically stops outputting the enable signal to the enable signal input end EN' within the first predetermined duration Toff, and outputs, to the signal input end, the radio frequency signal corresponding to the at least one piece of pilot data and synchronously outputs the enable signal to the enable signal input end EN' within the second predetermined duration Ton. Therefore, it is ensured that within the specific duration, the radio frequency power amplifier 103 may periodically be in the dormant state within the first predetermined duration Toff, and the base station can detect a pilot signal, thereby not only reducing power consumption but also maintaining channel stability.

In addition, the foregoing group of data packets, the another group of data packets and the pilot data are recorded in one or more radio frames. Preferably, one piece of pilot data is preferably recorded in one radio frame. When one piece of pilot data is recorded in one radio frame, the signal processing module 101 outputs, to the radio frequency signal input end RF_in' within the second predetermined duration Ton, a radio frequency signal corresponding to two pieces of pilot data, and the second predetermined duration Ton may be correspondingly set to be greater than duration of two radio frames, thereby ensuring that the base station can at least obtain one piece of pilot data within the second predetermined duration Ton.

Figure 5:
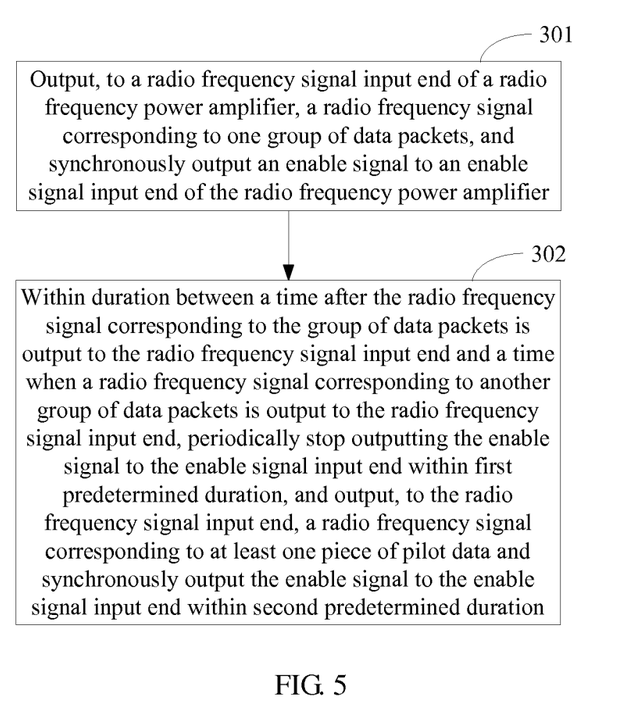
FIG. 5 is a flowchart of a method for controlling a radio frequency power amplifier of a mobile communications terminal according to a second embodiment of the present invention.

In the following, referring to FIG. 5, FIG. 5 is a flowchart of a method for controlling a radio frequency power amplifier 103 of a mobile communications terminal 10 according to a second embodiment of the present invention. As shown in FIG. 5, the method includes the following steps:

Step 301: Output, to a radio frequency signal input end RF_in' of the radio frequency power amplifier 103, a radio frequency signal corresponding to one group of data packets, and synchronously output an enable signal to an enable signal input end EN' of the radio frequency power amplifier 103.

Step 302: Within duration between a time after the radio frequency signal corresponding to the group of data packets is output to the radio frequency signal input end RF_in' and a time when a radio frequency signal corresponding to another group of data packets is output to the radio frequency signal input end RF_in', periodically stop outputting the enable signal to the enable signal input end EN' within first predetermined duration Toff, and output, to the radio frequency signal input end RF_in', a radio frequency signal corresponding to at least one piece of pilot data and synchronously output the enable signal to the enable signal input end EN' within second predetermined duration Ton.

The foregoing first predetermined duration Toff is less than pilot detection timeout duration of a base station, and the group of data packets and the another group of data packets are data packets that need to be transmitted over an uplink traffic channel.

The foregoing steps 301-303 are all executed by the signal processing module 101 shown in FIG. 2, and because the foregoing steps have been specifically described in the embodiment shown in FIG. 2, no details are repeatedly described herein.

Therefore, based on the foregoing disclosed content, according to the technical solutions disclosed in the present invention, when an uplink traffic channel is in an idle state, outputting of an enable signal to an enable signal input end EN' of a radio frequency power amplifier 103 is periodically stopped within first predetermined duration Toff, so as to make the radio frequency power amplifier 103 be dormant; and a radio frequency signal corresponding to at least one piece of pilot data is output to a radio frequency signal input end RF_in' of the radio frequency power amplifier 103 and the enable signal is synchronously output to the enable signal input end EN' within second predetermined duration Ton, so as to make the radio frequency power amplifier 103 work. Because the radio frequency power amplifier 103 is dormant within the first predetermined duration Toff, power consumption can be reduced. Within the second predetermined duration Ton, the radio frequency power amplifier 103 is enabled, and the radio frequency signal corresponding to the at least one piece of pilot data is output to the radio frequency signal input end RF_in', so that it can be ensured that the radio frequency signal corresponding to the at least one piece of pilot data can be input to the enabled radio frequency power amplifier 103 for subsequent processing, and in an adjacent period, because a time interval between adjacent radio frequency signals corresponding to the pilot data is the first predetermined duration Toff, which is less than pilot detection timeout duration, for the pilot data, of a base station, the base station does not determine, because the radio frequency signal corresponding to the pilot data is not detected within the first predetermined duration Toff, that a mobile communications terminal 10 is offline, thereby ensuring normal working of the uplink traffic channel.

The foregoing descriptions are merely embodiments of the present invention, but are not intended to limit the patent scope of the present invention. All equivalent structures or equivalent process changes made according to the content of this specification and accompanying drawings of the present invention or by directly or indirectly applying the present invention to other related technical fields shall fall within the protection scope of the present invention.

What is claimed is:

1. A mobile communications terminal comprising:
   a radio frequency power amplifier; and
   a signal source connected to the radio frequency power amplifier, and configured to output, to a radio frequency signal input end of the radio frequency power amplifier, a radio frequency signal corresponding to a first group of data packets, the signal source further configured to synchronously output an enable signal to an enable signal input end of the radio frequency power amplifier;
   wherein the signal source is configured to, within a duration between a first time after the radio frequency signal corresponding to the first group of data packets is output to the radio frequency signal input end and a second time when a radio frequency signal corresponding to a second group of data packets is output to the radio frequency signal input end, periodically stop outputting the enable signal to the enable signal input end for a first predetermined duration, and output, to the radio frequency signal input end, a radio frequency signal corresponding to at least one piece of pilot data and synchronously output the enable signal to the enable signal input end for a second predetermined duration;
   wherein the first predetermined duration is less than a pilot detection timeout duration of a base station with which an uplink traffic channel is being established, the pilot detection timeout duration being a period of time when the base station detects whether pilot data is received from the mobile communications terminal; and
   wherein the first group of data packets and the second group of data packets each comprise data packets to be transmitted over the uplink traffic channel with the base station.

2. The mobile communications terminal according to claim 1, wherein the signal source is further configured to keep outputting the enable signal to the enable signal input end for a preset extended duration after outputting, to the radio frequency signal input end, the radio frequency signal corresponding to at least one of the first group of data packets and the second group of data packets.

3. The mobile communications terminal according to claim 1, wherein the first group of data packets, the second group of data packets, and the at least one piece of pilot data are in one or more radio frames.

4. The mobile communications terminal according to claim 1, wherein the radio frequency power amplifier is configured to perform power amplification processing on the radio frequency signal corresponding to the first group of data packets, the radio frequency signal corresponding to the second group of data packets, and the radio frequency signal corresponding to the at least one piece of pilot data that are input to the radio frequency signal input end.

5. The mobile communications terminal according to claim 4, further comprising:
   an antenna;
   wherein the radio frequency power amplifier has a radio frequency signal output end;
   wherein the radio frequency power amplifier is further configured to send, to the antenna by using the radio frequency signal output end and after the power amplification processing, the radio frequency signal corresponding to the first group of data packets, the radio frequency signal corresponding to the second group of data packets, and the radio frequency signal corresponding to the at least one piece of pilot data; and
   wherein the antenna is configured to send, to the base station and after the power amplification processing, the radio frequency signal corresponding to the first group of data packets, the radio frequency signal corresponding to the second group of data packets, and the radio frequency signal corresponding to the at least one piece of pilot data.

6. A method for controlling a radio frequency power amplifier of a mobile communications terminal comprising:

outputting, by a signal source of the mobile communications terminal and to a radio frequency signal input end of a radio frequency power amplifier of the mobile communications terminal, a radio frequency signal corresponding to a first group of data packets, and synchronously outputting, by the signal source, an enable signal to an enable signal input end of the radio frequency power amplifier; and periodically stopping outputting, by the signal source and within a first output duration between a time after the radio frequency signal corresponding to the first group of data packets is output to the radio frequency signal input end and a time when a radio frequency signal corresponding to a second group of data packets is output to the radio frequency signal input end, the enable signal to the enable signal input end for a first predetermined duration; and outputting to the radio frequency signal input end, by the signal source and within the first output duration, a radio frequency signal corresponding to at least one piece of pilot data and synchronously outputting, by the signal source, the enable signal to the enable signal input end for a second predetermined duration;

wherein the first predetermined duration is less than a pilot detection timeout duration of a base station with which the mobile communications terminal establishes an uplink traffic channel, the pilot detection timeout duration being a period of time when the base station detects whether pilot data is received from the mobile communications terminal; and wherein the first group of data packets and the second group of data packets are data packets that need to be transmitted over the uplink traffic channel.

7. The method according to claim 6, further comprising maintaining output of the enable signal to the enable signal input end for a preset extended duration after the radio frequency signal corresponding to the first group of data packets is output to the radio frequency signal input end.

8. The method according to claim 6, wherein the first group of data packets, the second group of data packets, and the at least one piece of pilot data are in one or more radio frames.

9. The method according to claim 6, wherein the method further comprises:

performing, by the radio frequency power amplifier, power amplification processing on the radio frequency signal corresponding to the first group of data packets, the radio frequency signal corresponding to the second group of data packets, and the radio frequency signal corresponding to the at least one piece of pilot data that are input to the radio frequency signal input end.

10. The method according to claim 9, further comprising:

sending, by the radio frequency power amplifier, to an antenna of the mobile communications terminal and by using a radio frequency signal output end of the radio frequency power amplifier, the radio frequency signal corresponding to the first group of data packets, the radio frequency signal corresponding to the second group of data packets, and the radio frequency signal corresponding to the at least one piece of pilot data, wherein the sending to the antenna is after the power amplification processing, and sending, by the antenna, to the base station, the radio frequency signal corresponding to the first group of data packets, the radio frequency signal corresponding to the second group of data packets, and the radio frequency signal corresponding to the at least one piece of pilot data, wherein the sending by the antenna is after the power amplification processing.

* * * * *